United States Patent [19]

Tharbs

[11] Patent Number: 5,374,918
[45] Date of Patent: Dec. 20, 1994

[54] VEHICULAR ABUTMENT ALARM APPARATUS

[76] Inventor: Eddie W. Tharbs, 1100 N. LaSalle, Apt. 407, Chicago, Ill. 60610

[21] Appl. No.: 988,856

[22] Filed: Dec. 10, 1992

[51] Int. Cl.⁵ ............................................. B60Q 1/00
[52] U.S. Cl. .................... 340/438; 340/440; 340/435; 340/437; 200/61.44; 180/224; 116/28 A
[58] Field of Search ............... 340/438, 435, 436, 437, 340/440, 689; 200/61.43, 61.44, 61.42; 180/224; 116/28 A

[56] References Cited

U.S. PATENT DOCUMENTS

| | | | |
|---|---|---|---|
| 2,554,371 | 5/1951 | Marx | 340/436 |
| 2,834,002 | 5/1958 | Nordsiek | 340/436 |
| 3,269,783 | 8/1966 | Kriz | 340/436 |
| 3,360,775 | 12/1967 | Schroeder | 340/436 |
| 3,720,916 | 3/1973 | Edgar | 340/436 |
| 4,156,865 | 5/1979 | Lovell et al. | 340/436 |
| 4,237,446 | 12/1980 | Roberts | 340/436 |
| 4,307,375 | 12/1981 | Marshall, Sr. | 340/436 |
| 4,460,889 | 7/1984 | Elks | 340/436 |
| 4,855,736 | 8/1989 | Hsu | 340/436 |

Primary Examiner—John K. Peng
Assistant Examiner—Nina Tong
Attorney, Agent, or Firm—E. Michael Combs

[57] ABSTRACT

A tractor-trailer vehicle includes one, and typically a plurality, of signal switches mounted at spaced intervals along a top wall of the trailer structure, wherein engagement of the signal switches relative to an abutment effects audible and visual alarm within a cab of the associated transport vehicle structure.

3 Claims, 4 Drawing Sheets

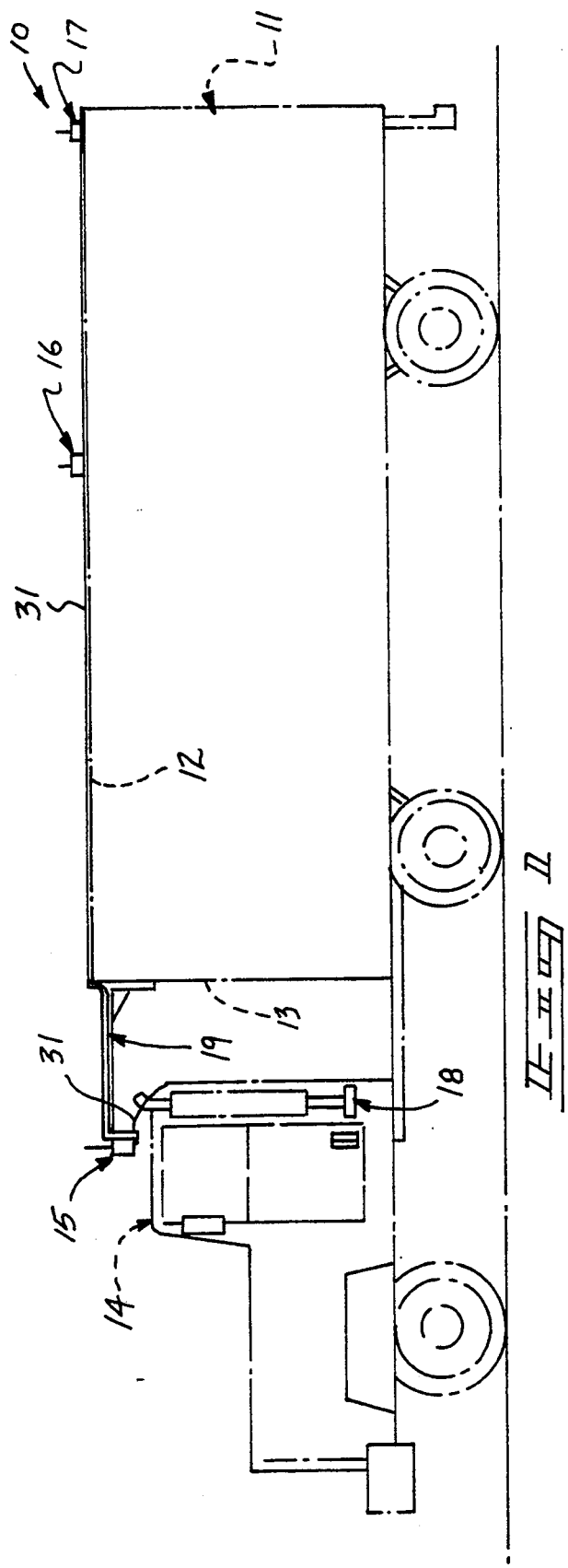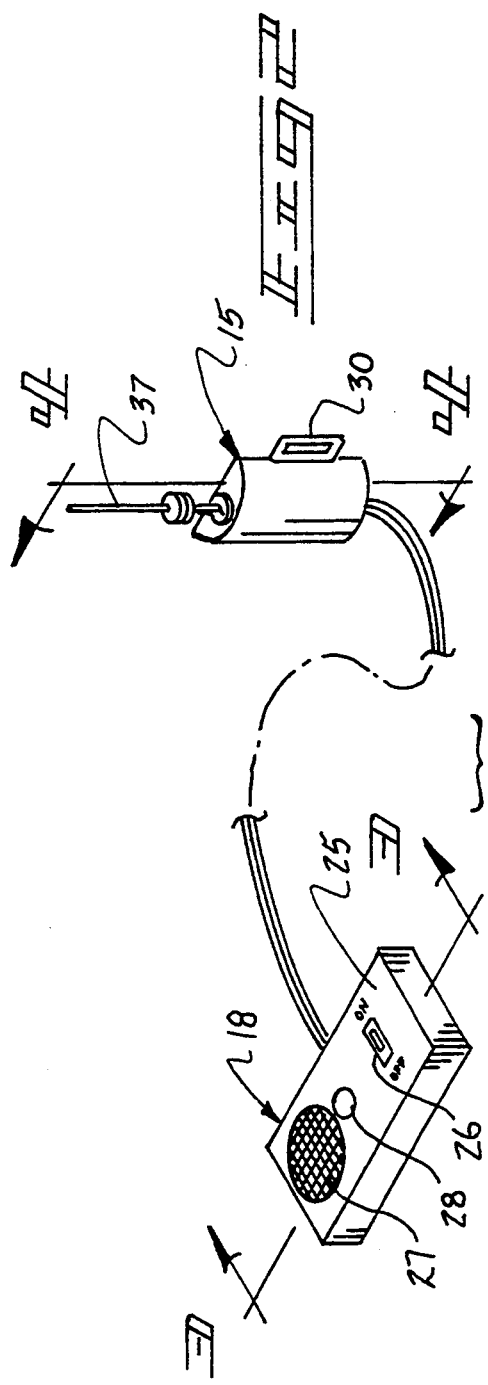

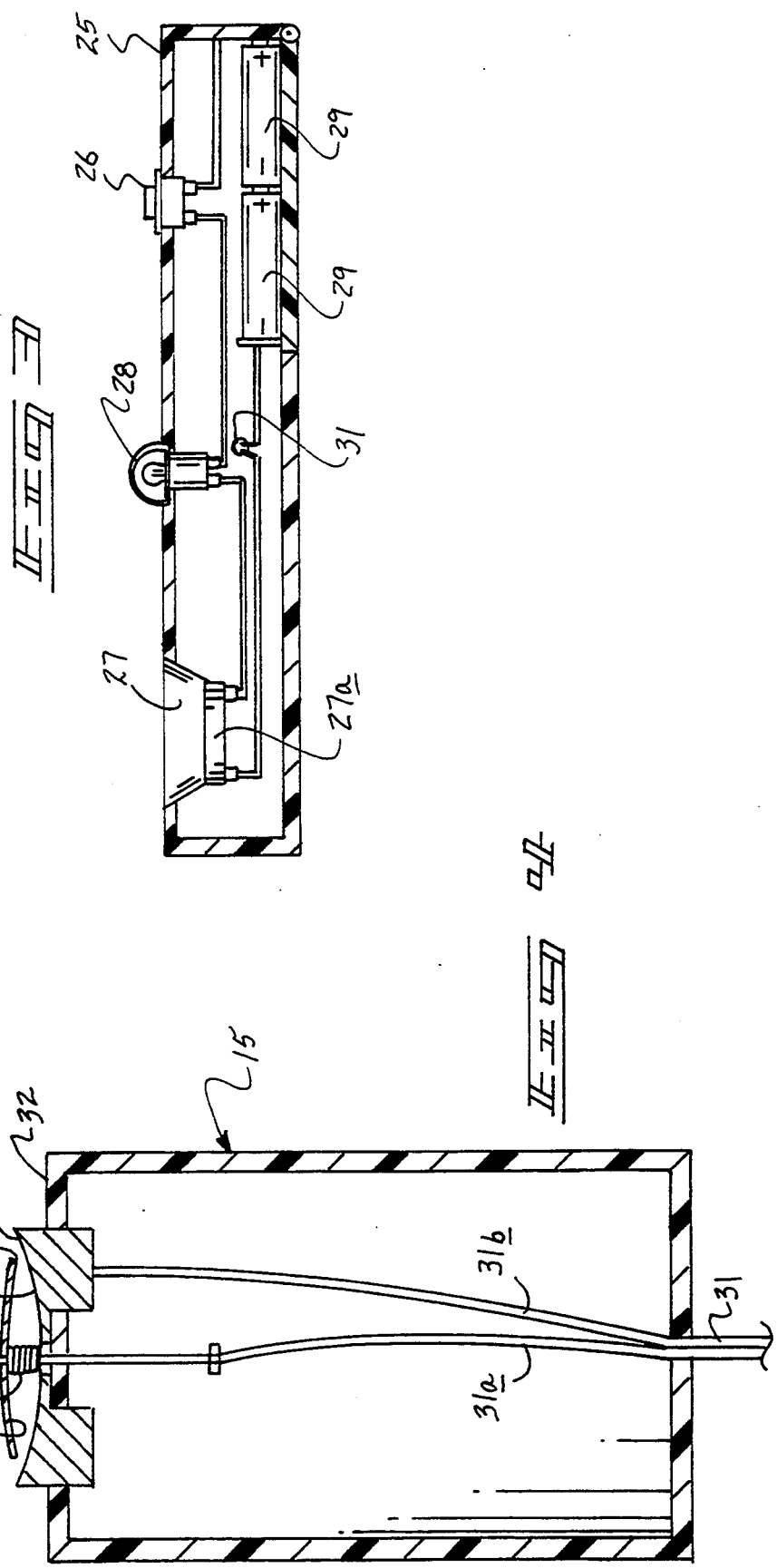

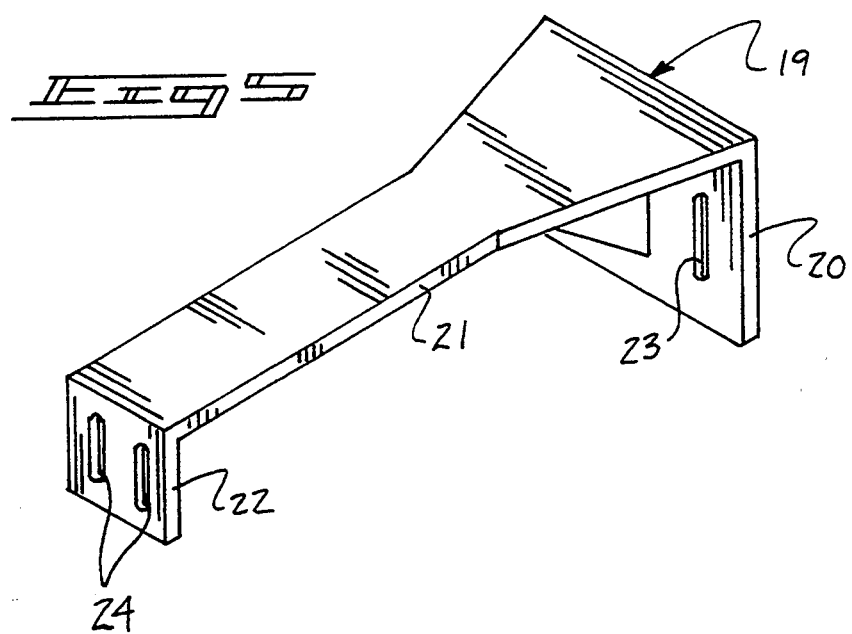
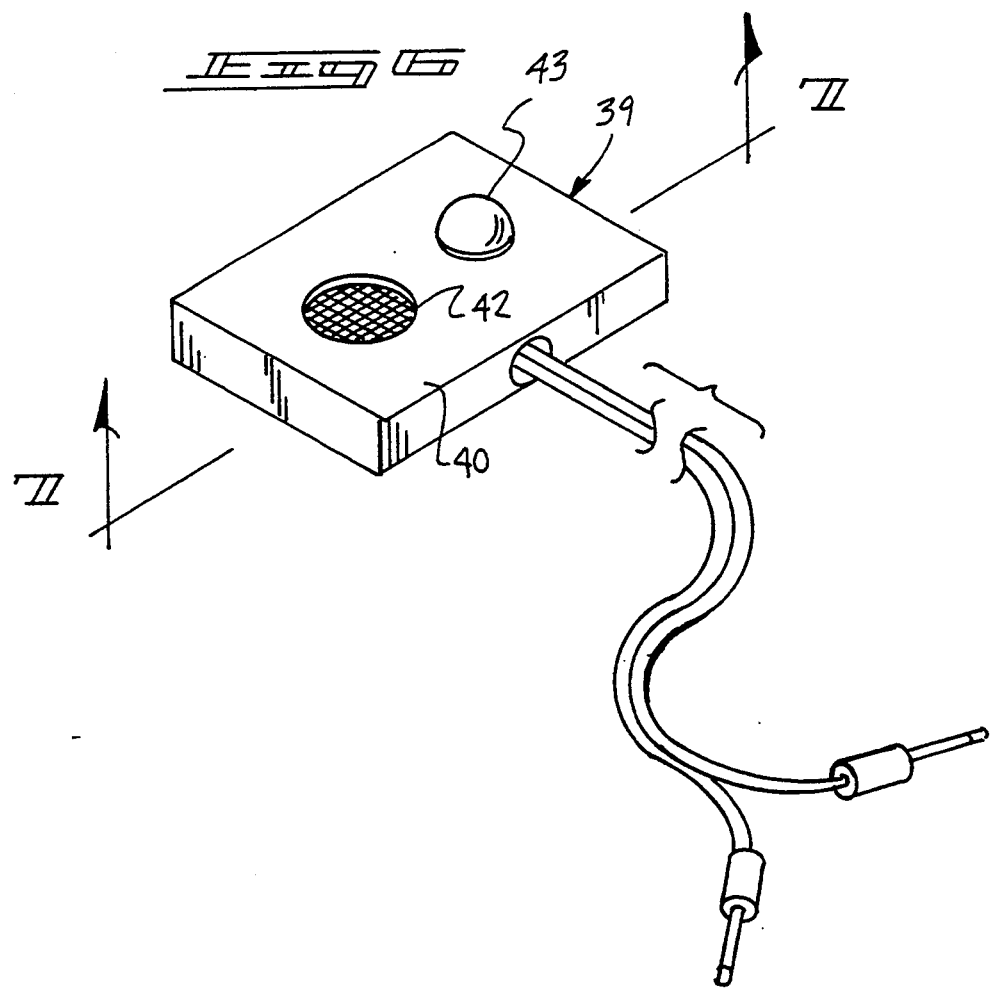

VEHICULAR ABUTMENT ALARM APPARATUS

BACKGROUND OF THE INVENTION

1. Field of the Invention

The field of invention relates to alarm apparatus, and more particularly pertains to a new and improved vehicular abutment alarm apparatus wherein the same is arranged to indicate abutment relative to an associated transport trailer vehicle.

2. Description of the Prior Art

Height indicator structure is available in the prior art and indicated by U.S. Pat. Nos. 5,011,358; 5,035,290; as well as a load indicator structure as indicated in U.S. Pat. No. 3,542,161.

The prior art has heretofore failed to provide for a readily mounted signal structure relative to a tractor-trailer arrangement as availed in the prior art and in this respect, the present invention substantially fulfills this need.

SUMMARY OF THE INVENTION

In view of the foregoing disadvantages inherent in the known types of alarm apparatus now present in the prior art, the present invention provides a vehicular abutment alarm apparatus wherein the same is arranged to provide for audible and visual signal structure relative to an interior cab surface of an associated transport vehicle. As such, the general purpose of the present invention, which will be described subsequently in greater detail, is to provide a new and improved vehicular abutment alarm apparatus which has all the advantages of the prior art alarm apparatus and none of the disadvantages.

To attain this, the present invention provides a tractor-trailer vehicle including one, and typically a plurality, of signal switches mounted at spaced intervals along a top wall of the trailer structure, wherein engagement of the signal switches relative to an abutment effects audible and visual alarm within a cab of the associated transport vehicle structure.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicular abutment alarm apparatus which has all the advantages of the prior art alarm apparatus and none of the disadvantages.

It is another object of the present invention to provide a new and improved vehicular abutment alarm apparatus which may be easily and efficiently manufactured and marketed.

It is a further object of the present invention to provide a new and improved vehicular abutment alarm apparatus which is of a durable and reliable construction.

An even further object of the present invention is to provide a new and improved vehicular abutment alarm apparatus which is susceptible of a low cost of manufacture with regard to both materials and labor, and which accordingly is then susceptible of low prices of sale to the consuming public, thereby making such vehicular abutment alarm apparatus economically available to the buying public.

Still yet another object of the present invention is to provide a new and improved vehicular abutment alarm apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic side view of the invention.

FIG. 2 is an isometric view of the invention indicating a signal switch member relative to an alarm housing.

FIG. 3 is an orthographic view, taken along the lines 3-3 of FIG. 2 in the direction indicated by the arrows.

FIG. 4 is an orthographic view, taken along the lines 4-4 of FIG. 2 in the direction indicated by the arrows.

FIG. 5 is an isometric illustration of a bracket structure employed by the invention.

FIG. 6 is an isometric illustration of a remote alarm member utilized by the invention.

DESCRIPTION OF THE PREFERRED EMBODIMENT

Figure 7:
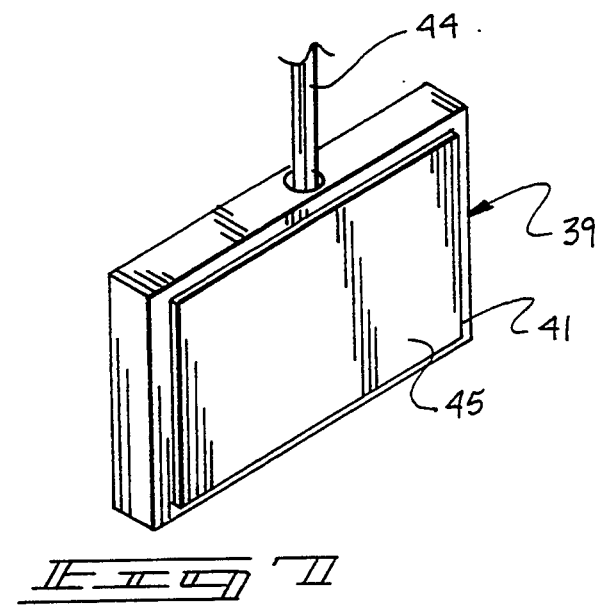
FIG. 7 is an isometric rear view of the remote alarm member of the invention.

With reference now to the drawings, and in particular to FIGS. 1 to 8 thereof, a new and improved vehicular abutment alarm apparatus embodying the principles and concepts of the present invention and generally designated by the reference numeral 10 will be described.

More specifically, the vehicular abutment alarm apparatus 10 of the instant invention essentially comprises mounting to an associated vehicular trailer 11, having a trailer top wall 12 spaced from a trailer front wall 13. A vehicular cab 14 is provided, having an interior cab cavity, such as indicated in FIG. 8.

A first switch 15 is mounted in a spaced relationship relative to a vehicular front wall 13, wherein second and third switches 16 and 17 respectively are mounted at spaced intervals along the trailer top wall 12, A receiver unit 18 is mounted within the vehicular cab 14 in electrical communication with the first, second, and third switches 15, 16, and 17 respectively through an associated electrical communication cable 31.

The FIG. 2 indicates the receiver unit 18 having a housing top wall 25, wherein an on/off switch 26, as well as a speaker member 27 and illumination bulb 28, project in electrical communication with the batteries 29 and with the electrical communication cable 31. The first switch 15 is typical of the construction of the second and third switches as well and includes a switch housing having in connection with the first switch, first switch housing slots 30 for mounting to an associated mounting bracket 19, such as indicated in the FIGS. 1 and 5. The mounting bracket 19 includes a first wall 20 spaced from and parallel a third wall 22, having an interconnecting second wall 21 orthogonally oriented to the first and third walls 20 and 22, wherein the first wall 20 includes first wall slots 23, wherein the third wall includes third wall slots 24. The first wall slots 23 permit height adjustment mounting of the mounting bracket 19 to the vehicular front wall 13 to align the second wall 21 in adjacency to the top wall 12. A third wall 22 having the third wall slots 24 is arranged for mounting of the first switch housing slots 30 therealong utilizing conventional mechanical fasteners to position a projecting rigid rod 37 in a spaced relationship beyond and above the trailer top wall 12. The rigid rod 37 is in electrical communication with a first cable member 31a of the electrical communication cable 31 (see FIG. 4), wherein a second cable member 31b is in electrical communication with a metallic first contact 33 mounted to the housing top wall 22 of the first switch housing 30. The first contact 33 is provided with a concave top wall 34, wherein a metallic second contact 35 having a concave second contact bottom wall 36 is arranged in confronting relationship relative to the concave top wall 34, wherein the metallic second contact 35 is of a generally semi-spherical configuration having an annular contact edge 35b in spaced adjacency to the concave first contact top wall 34. In this manner, pivotal displacement of the rigid rod 37 relative to the first contact top wall 34 effects communication and completes electrical circuitry, wherein electrical communication to the batteries 29 effects simultaneous actuation of the illumination bulb 28 and an audible alarm operative through audible amplifier portion 27a. A polymeric spring 38 is interposed between the concave first contact top wall 34 and the concave second contact bottom wall 36. Further it should be noted that the first cable member 31a is in electrical insulative relationship relative to the metallic first contact 33 as it is directed therethrough and in turn is in electrical communication with the rigid rod 37.

Figure 8:
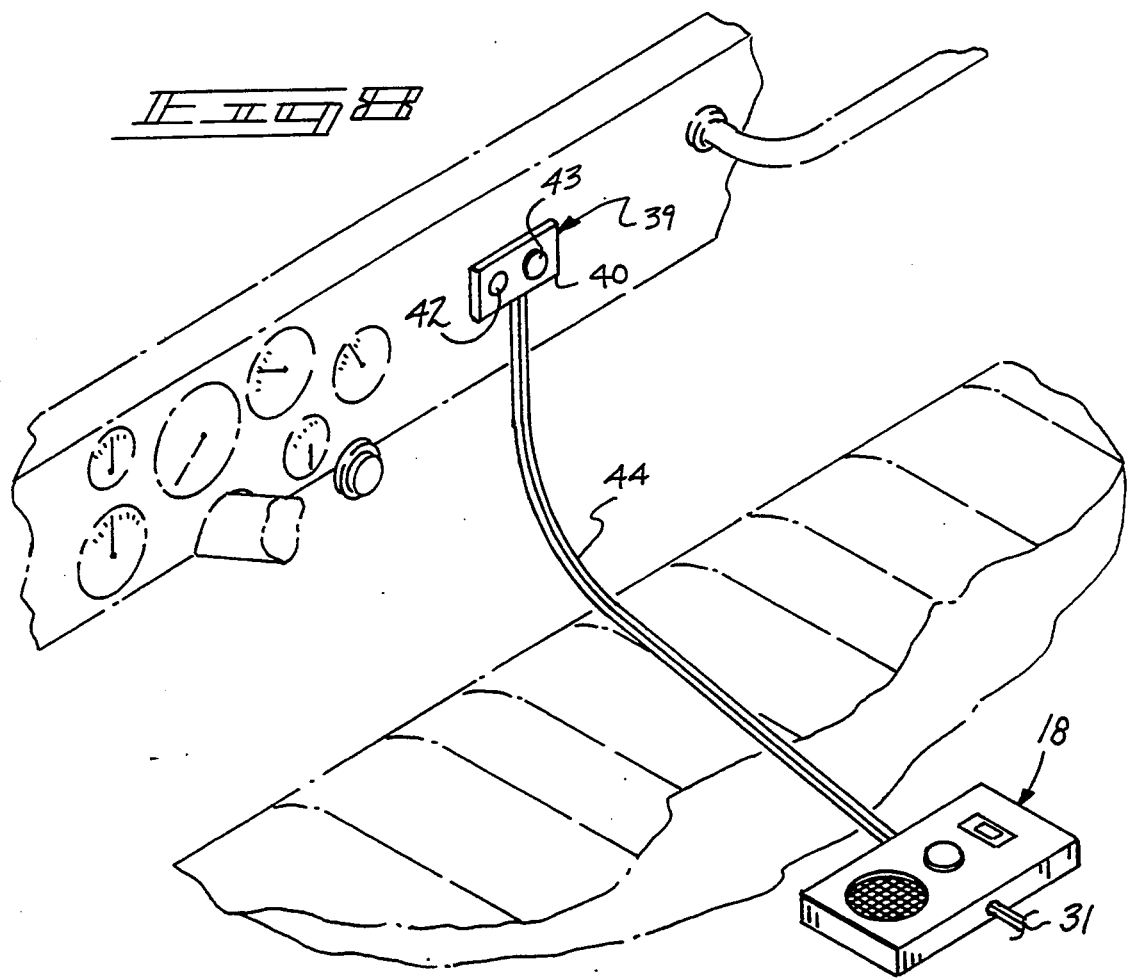
FIG. 8 is an isometric view of the alarm housing and remote alarm housing employed by the invention within a vehicular cab.

The FIGS. 6–8 indicates the use of a remote alarm housing 39 arranged for electrical communication with the receiver unit 18 utilizing whatever conventional jack structure is available, such as indicated in FIG. 6, to electrically communicate the remote alarm housing 39 with the electrical communication cable 31. The remote alarm housing 39 includes a remote housing front wall 40 spaced from a remote housing rear wall 41, wherein the rear wall 41 includes a ferromagnetic plate 45 to permit magnetic adherence of the remote alarm housing 39 to an associated dashboard within the motor vehicle, as indicated in FIG. 8. A second speaker 42, as well as a second illumination bulb 43, are mounted to the housing front wall 40, wherein to the remote electrical communication cable 44, simultaneous audible alarm through the second speaker 42, as well as illumination of the second illumination bulb 43, is provided. The second speaker 42 and the second illumination 43 are arranged for direct current communication with the electrical communication cable 31 and are similarly powered by use of similar structure as indicated relative to the receiver unit 18.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A vehicular abutment alarm apparatus in combination with a vehicular trailer, wherein the trailer includes a trailer top wall spaced from a trailer front wall, and a vehicular cab arranged for mounting to the vehicular trailer, wherein the apparatus comprises, a mounting bracket means for adjustable mounting along the trailer front wall in adjacency to the trailer top wall, wherein the mounting bracket means includes a first switch, the apparatus further including a second switch, and a third switch each respectively mounted to the trailer top wall in a spaced relationship relative to one another and to the first switch, a receiver unit mounted within the vehicular cab in electrical communication with the first switch, the second switch, and the third switch, wherein individual engagement of the first switch, the second switch, and the third switch with an abutment effects actuation of the receiver unit, the receiver unit includes a receiver housing top wall having an on/off switch, a speaker member, and an illumination bulb, and batteries contained within the receiver unit, with the on/off switch, the speaker member, the illumination bulb arranged in electrical communication with the first switch, the second switch, and the third switch to include an electrical communication cable in electrical communication between the receiver unit, the first switch, the second switch, and the third switch, said first switch, said second switch, and said third switch each include a switch housing, each switch housing having a switch housing top wall, with the electrical communication cable directed into each switch housing, wherein the electrical communication cable includes a first cable member and a second cable member, the first cable member directed to the switch housing top wall, wherein the switch housing top wall includes a metallic rigid rod directed therethrough in electrical communication with the first cable member, and a metallic first contact mounted to the switch housing top wall in electrical isolation relative to the rigid rod, with the metallic first contact in electrical communication with the second cable member, and the metallic first contact having a concave top wall, and a metallic second contact of a semi-spherical configuration positioned above the concave top wall having an annular contact edge spaced from and in adjacency to the contact top wall, wherein the metallic second contact having a concave bottom wall in confrontation to the concave top wall and the metallic second contact, including a polymeric spring interposed and captured between the metallic first contact and the metallic second contact, whereupon deflection of the rigid rod effects electrical communication between the first contact and the second contact.

2. An apparatus as set forth in claim 1 wherein the mounting bracket means includes a mounting bracket having a first wall parallel to and spaced from a third wall, and a second wall orthogonally mounted between and integral to the first wall and the third wall, wherein the first wall includes first wall slots for adjustable mounting of the mounting bracket to the trailer front wall, and wherein the mounting bracket third wall includes third wall slots, and wherein the first switch includes a first switch slotted plate member for adjustable mounting to the third wall slots.

3. An apparatus as set forth in claim 2 including a remote alarm housing, the remote alarm housing includes a housing front wall and a housing rear wall, wherein the housing rear wall includes a ferromagnetic plate permitting magnetic adherence of the remote alarm housing within the vehicular cab, and wherein the remote alarm housing includes a second speaker and a second illumination bulb arranged for simultaneous actuation with the speaker member and the illumination bulb of the receiver unit.

* * * * *